United States Patent [19]

Braverman

[11] 4,140,807
[45] Feb. 20, 1979

[54] FLAVORED FREEZABLE-GEL CONFECTION

[76] Inventor: Amiel Braverman, 5664 Darlington Rd., Pittsburgh, Pa. 15217

[21] Appl. No.: 828,929

[22] Filed: Aug. 29, 1977

[51] Int. Cl.$^2$ ................................................ A23L 1/04
[52] U.S. Cl. ..................................... 426/573; 426/575; 426/577; 426/660
[58] Field of Search ............... 426/573, 575, 577, 565, 426/330.2, 584, 660

[56] References Cited

U.S. PATENT DOCUMENTS

| | | | |
|---|---|---|---|
| 3,493,394 | 2/1970 | Eldridge | 426/577 |
| 3,499,768 | 3/1970 | Moirano | 426/575 |
| 3,784,715 | 1/1974 | Arden | 426/330.2 |
| 3,978,243 | 8/1976 | Pedersen | 426/575 |
| 3,996,390 | 12/1976 | Igoe | 426/573 |

Primary Examiner—Jeanette M. Hunter
Attorney, Agent, or Firm—Berman, Aisenberg & Platt

[57] ABSTRACT

Freeze-it-yourself pops are prepared by sealing an edible, room-temperature-storable, storage-stable, aqueous, opaque, flavored confection in a plastic film pak. The confection composition is in the form of an aqueous gel having a pH within the range of from about 3.0 to about 5.0; it has a pudding consistency when maintained at room temperature, but has a chewy consistency when frozen. Either low-methoxyl pectin alone, carrageenan alone, a combination of low-methoxyl pectin and carboxymethylcellulose or a combination of carrageenan and carboxymethylcellulose provides the composition with homogeneity, stability and the noted consistency in both frozen and unfrozen states.

33 Claims, No Drawings

FLAVORED FREEZABLE-GEL CONFECTION

BACKGROUND OF THE INVENTION

1. Field of the Invention

Liquid confections having different colors and flavors (all substantially transparent) have been sold for subsequent freezing to an icy consistency ("ice pops"). These liquid confections are generally packaged in plastic packs, such as those made of polyethylene, cellophane and other similar films. Such confections comprise suitable flavoring, sugars, such as cane and corn sugars, acid, vegetable gum stabilizer and preservative, such as sodium benzoate and potassium sorbate or sorbic acid. The confection is conventionally sealed in the plastic film and is ordinarily sold in liquid form at room temperature. The thus-packaged confection is designed to be frozen prior to eating. A recent patent for a nontransparent chocolate-flavored confection of this general type, but requiring xanthan-gum stabilization, is U.S. Pat. No. 3,784,715.

2. Description of the Prior Art

Stabilized liquid or semi-liquid food compositions with or without milk and having a chocolate or other flavor have been prepared over the years. Such compositions are considered by Hunter (U.S. Pat. No. 1,043,839) and North (U.S. Pat. No. 1,710,507). North suggests the use of vegetable gum, such as Irish moss, as a thickener for his milk-containing compositions. Schweigart (U.S. Pat. No. 1,887,905) considers the importance of controlling the acidity of food concentrates and indicates the types of acids which are useful for this purpose. Linn (U.S. Pat. Nos. 1,989,758 and 2,014,623) indicates that stabilizing gums for chocolate compositions (with or without milk) include pectins, such as Irish moss. Pectin is used under controlled pH conditions to obtain substantially-uniform stable suspensions and to improve the consistency or "body" of chocolate beverages by Joseph (U.S. Pat. No. 1,993,932). Irish moss is combined with alginate by Green (U.S. Pat. No. 2,097,224) in a chocolate milk drink. A more chewy frozen milk product, such as ice cream, is provided by Green (U.S. Pat. No. 2,097,225) by combining Irish moss and alginate in milk-containing compositions.

Whittingham (U.S. Pat. No. 2,493,732) relates to a chocolate syrup wherein pectins are used as a dispersoid under controlled pH conditions. Carrageenin is used by North (U.S. Pat. No. 2,672,419) in a concentrated milk-containing frozen mix, which is flexible (as distinguished from a stiff-frozen condition) and which, on thawing and on being reconstituted with cold water, produces a chocolate drink. Köhler (U.S. Pat. No. 2,854,340) relates to frozen desserts in which stabilizers are used under controlled acidic conditions; these desserts have a milk base and chocolate or fruit flavor. Smith (U.S. Pat. No. 3,385,714) uses a combination of carrageenin and sodium carboxymethylcellulose as a viscosity-controlling agent in his liquid milkshake mixes, which contain non-fat milk solids (NFMS). Hotelling (U.S. Pat. No. 3,486,905) finds carrageenan, when used alone, as an inadequate stabilizer in chocolate beverage compositions containing NFMS. In enumerating stabilizers for NFMS-containing food compositions (including ice cream mixes, pie fillings and puddings), Steward (U.S. Pat. No. 3,666,497) lists carrageenin and pectins separately, as well as sodium carboxymethylcellulose.

Definitions

Several terms used in the prior art and used in describing the present invention have meanings which are not always ultimately clear. Since prior art indicates that Irish moss is illustrative of what is meant by "pectins", the relationship between "pectins", "LMP" and "CGN" is provided by these definitions. References in the prior art to pectin or to pectins are not references to LMP unless such is specifically indicated. There is a significant difference between pectin and LMP, and background authority for this significant difference is provided in the following definitions:

brix scale a hydrometer scale for aqueous sugar solutions so graduated that its readings in degrees Brix at a specified temperature represent percentages by weight of sugar (sucrose) in the solutions ("Webster's Third New International Dictionary", page 279, G. & C. Merriam Company, Springfield, Mass, 1971); in the food industry it is also a measure of percent total soluble solids. Since most solids in the subject products are water soluble, Brix provides a good measure of the weight of the solids expressed as a percent of the total weight.

carboxymethylcellulose (CMC) a thickening, suspending and stabilizing agent ("The Encyclopedia of Chemistry", second edition, page 195, Van Nostrand Reinhold Company, 1966).

carrageen, carragheen

Irish moss ("Hackh's Chemical Dictionary" fourth edition, page 136, McGraw-Hill Book Company, 1969)

carrageenan (CGN) a naturally-occurring hydrocolloid consisting of high-molecular weight linear sulfated polysaccharides. It is obtained commercially by extraction from several related species of red algae seaweed and is widely used in the food industry as a stabilizer and gelling agent ("CARRAGEENAN", a Scientific Status Summary of the IFT Expert Panel, Institute of Food Technologists, 1973); — an extact of various Floridea algae (Rhodophycea) belonging to the genera, Gelidium, Chondrus, Polyides and Gigartina; the most known carrageenans are lambda-, kappa-, iota-, mu- and nu-carrageenans, which are, in particular, described by Janistyn, H., and Huethig, Alfred, "Handbuch der Kosmetika und Riechstoffe", pages 181 and 182, Verlag Heidelberg, 1969; the average molecular weight of carrageenans is between 100,000 and 1,000,000.

carrageenin highly depolymerized derivative of carrageenan (U.S. Pat. No. 4,029,760);

a water-soluble extractive from carragheen; used as a stabilizer, for suspending cocoa in chocolate manufacture and to clarify beverages ("Hackh's Chemical Dictionary", supra).

cocoa either natural-process cocoa, bittersweet chocolate or chocolate liquor having equivalent cocoa solids content; wherever the term "cocoa" is used in this specification or the claims, it will be understood to include chocolate material having the equivalent in cocoa solids, as well as cocoa per se. Cocoas generally contain from about 8 to 28 weight-percent fat. While low-fat cocoas having about 8 to 14, and preferably 10 to 12, weight-percent fat are preferred, higher-fat cocoas, such as those having from 16 to 22 weight percent may also be used. The cocoa should be present in the compositions of the present invention in amounts of about 1 to 5 weight percent. The compositions suitably contain, e.g., a mixture of low fat cocoas, and a particularly preferred chocolate-flavored liquid confection has about 1 to 2 weight percent of natural-process cocoa.

food acid any acid suitable for use in food, including both organic, e.g. citric, tartaric, malic, fumaric and lactic, acid, and inorganic, e.g. phosphoric, acid.

gel a large number of micelles separated by exceedingly thin films of liquid dispersion-medium; distinguished from sols by the fact that they possess form and offer resistance to deformation even though their liquid phase may comprise a large proportion; under certain circumstances, some sols "set" completely to a jelly-like mass, called a gel; this process is called *gelatinizing, gelatinization* or *gelation* (MacDougall, "Physical Chemistry", revised edition, pages 665 and 705, The Macmillan Company, 1943)

a colloid in a more solid form than a sol; a semisolid apparently homogeneous substance that may be elastic and jelly-like (as gelatin) or more or less rigid (as silica gel) and that is formed by coagulation of a sol in various ways (as by cooling, by evaporation, or by precipitation with an electrolyte); a disperse system consisting typically of a high-molecular weight compound or an aggregate of small particles in very close association with a liquid ("Webster's Third New International Dictionary", supra, page 243)

jelly a semitransparent easily-melted food preparation having a soft somewhat elastic consistency due to the presence of gelatin, pectin, or a similar substance; a fruit product made by boiling sugar and the juice of fruit containing pectin ("Webster's Third New International Dictionary", supra, page 1213)

In the preparation of fruit jelly, a proper combination of acid, pectin and sugar in water must be attained to form a gel. Acceptable gel formation requires a balance of acid, pectin and sugar concentrations (which are interdependent) with other variables. Only a very weak gel forms at a pH below 2.9, and no gel forms at a pH above 3.5. A jelly is a semi-solid food. It is made from not less than 45 parts by weight of fruit juice for each 55 parts by weight of sugar, the resulting product being concentrated to not less than 65 percent by weight of soluble solids ("McGraw-Hill Encyclopedia of Science and Technology", third edition, volume 5, page 454, McGraw-Hill, Inc., 1971).

pectic acid any of the pectic substances composed mostly of colloidal polymeric galacturonic acids and essentially free from methyl ester groups.

pectic substance any of a group of complex colloidal carbohydrate derivatives of plant origin containing a large proportion of units derived from galacturonic acid and subdivided into protopectins, pectins, pectinic acids and pectic acids.

pectin any of the group of colorless amorphous methylated pectic substances occurring in plant tissues or obtained by restricted treatment of protopectin (as with protopectinase or acids) that are found in or obtained esp. from fruits or succulent vegetables, that yield viscous solutions with water and, when combined with acid and sugar in proper concentration, yield a gel constituting the basis of fruit jellies, and that (on hydrolysis) yield pectic acids and methanol; esp: a pectinic acid containing at least 7 to 8 percent methyl ester groups expressed as methoxyl ("Webster's Third New International Dictionary", supra, pages 1662 and 1663)

*pectins or high-ester pectins* (HEP) are pectinic acids that contain at least 7 or 8 percent methyl ester (expressed as methoxyl) while the *low-ester (low methoxyl) pectins* (LMP) contain less than 7 percent (usually 3 to 5 percent) methoxyl; under suitable conditions, pectins will form *jellies* with sugar and acid, whereas the low-ester pectins will form *gels* with traces of polyvalent ions; pectins form firm jellies when combined with over 50 percent by weight of sugar and at a pH below 3.6. The manufacture and use of low-ester pectins and low-ester gels are regarded as new, separate, distinct and significant developments in pectin chemistry and technology. Low-ester pectins form gels with traces of calcium at sugar concentrations far below and even in the absence of the customary 65 percent used in jams and jellies; the formed gels often show an undesirable extent of syneresis, probably due to heterogeneity of constituent pectinic acids ("The Encyclopedia of Chemistry", supra, pages 783 and 784).

Commercial designation of pectin as jelly grade refers to the weight of sucrose which one unit weight of pectin (at suitable conditions of acidity) will form into a jelly containing 65 percent of sugar solids. Jelly grades between 150 and 300 reflect good commercial-grade pectins. To gel a high-ester pectin, no extensive cooling is required, whereas low-ester pectins, containing less than 7 percent (usually from 3 to 5 percent) methoxyl, gel only when cooled or when multivalent cations are added in small amounts (even at sugar concentrations far below 65 percent) ("McGraw-Hill Encyclopedia of Science and Technology", supra, volume 9, page 691)

pectins [according to U.S. Pat. No. 1,989,758 (page 1, right column, lines 29 and 30) and U.S. Pat. No. 2,014,623 (page 2, left column, lines 11 and 12)] are exemplified by Irish moss, citrus pectin and apple pectin; all references to pectins are to high-ester or high-methoxyl pectins in the absence of some express indication to the contrary.

pudding-like the consistency at room temperature of the non-settling compositions of this invention is that of what may be regarded as a loose gel; it is on the verge of being semi-solid and is clearly scoopable.

SUMMARY OF THE INVENTION

A pudding-like (highly-dense) opaque confection, which freezes to a chewy and virtually non-icy product without requiring xanthan-gum stabilization, is prepared with a wide range of flavors. In the non-frozen state solid particles, such as those of cocoa, fruit and pigment, are substantially-homogeneously suspended and maintained, thus providing an edible pudding, pie filling and/or dessert topping which does not require refrigeration. This confection has the following characteristics:

(1) Highly dense in consistency and opaque in appearance;

(2) Solid particles, such as those of cocoa, fruit (e.g. in the form of fruit paste, puree or pulp), titanium dioxide and artificial color, are suspended in a substantially-homogeneous product;

(3) When frozen, the product is chewy and virtually non-icy;

(4) It is prepared with a wide range of fruity flavors, including "acid fruits", such as cherry, lemon and orange, "low-acid fruits", such as mango, melon and coconut, and substantially non-acid fruits, such as banana;

(5) It is optionally prepared with virtually any other flavor, including chocolate, cinnamon, vanilla and caramel;

(6) It is virtually independent of pH within accepted practice, i.e., pH 3.0 is suitable for lemon; pH 3.2, for orange and cherry; pH 3.5, for grape; pH 3.8, for pineapple; pH 4.2, for melon; pH 4.3, for mango; pH 4.6, for coconut; pH 4.8, for butterscotch; pH 4.9, for caramel; and pH 5.0, for chocolate; pH 5.0 can be employed for "non-acid" products, but conformity to Federal Regulations (part 113) [cf. 21 CFR 507] requires special processing for all low-acid foods having a pH above pH 4.6.

(7) At room temperature these compositions assume a pudding-like consistency which makes them suitable for use as dessert pudding and pie filling.

All the noted characteristics are achieved through use of 1) *specific gum stabilizers,* such as CGN, LMP, CMC and combinations thereof and 2) *opacity-, milkiness- or turbidity-producing agents,* such as chocolate or cocoa, milk products, non-dairy whitener, and natural or artificial color, e.g. titanium dioxide. These are used individually or in any combination. Milk or dairy products include skim milk, non-fat milk powder (NFDM), evaporated milk, condensed milk, whole milk powder, whey, cream, casein and derivatives. Among non-dairy products known as coffee whiteners, emulsified vegetable fat is the principal ingredient.

Edible acid is incorporated in the composition according to taste preferences for the particular flavor employed. Acidity (pH 4.6 and below) also restricts the growth of pathogenic microorganisms.

Specified means to suspend and stabilize solid particles are combined in an opaque, flavored confection composition to provide a substantially homogeneous stable edible product which is stirrable (but will hold its shape when maintained in an undisturbed condition) at room temperature and can be frozen to a chewy condition. When maintained at room temperature, the composition is in gel form and contains preservative, sweetener, flavor-imparting ingredient means, sufficient water to provide a desired density and acid means to adjust the pH. The confection composition is ordinarily sealed in a plastic film pak in which it is sold. (It is optionally placed, e.g., in a sealed plastic cup or other suitable container for subsequent use, for example, as pie filling or dessert topping.) By placing the plastic film pak or sealed plastic cup and enclosed flavored-confection composition in a home freezer, a freeze-it-yourself pop is produced.

Liquid confections have been prepared with many different fruit flavors, packaged in plastic film packages and sold at room temperature for subsequent freezing and for consumption in the form of a Popsicle without a stick (a "pop"). These confections were of different colors, but were all substantially transparent and, when frozen, assumed an icy consistency. The acidity of these confections was usually within a pH range of from 2.7 to 3.5, which was in line with the characteristic flavor being simulated, namely, that of higher-acid fruits, such as lemon, cherry, grape and orange.

In distinction from such confections, an object of this invention is to provide confection compositions having a pudding-like consistency and an opaque appearance. The flavor is that of a higher-acid fruit, but is not so limited; it is optionally that of a "low-acid" fruit, such as that of mango, guava, banana or coconut, or the flavor of a non-fruity, non-acid confection, such as one having a chocolate, a butterscotch or a caramel flavor. Acid is incorporated in the subject compositions, inter alia, to restrict pathogenic microorganism growth. A further object of the present invention is to provide a confection with a pudding-like texture and which, when frozen, is opaque in appearance and chewy (and substantially non-icy) in consistency.

An additional object of this invention is to provide a confection composition having a pudding-like consistency and the flavor of virtually any fruit, including "high-acid" fruit, such as lemon, cherry and orange, the confection composition having a pH which is limited only by taste and Government regulations (preferably at most pH 4.6).

The subject compositions (in non-frozen form) are made homogeneous by imparting to them a viscosity which prevents or impedes any particles, such as those of fruit pulp, milk solids, artificial water-dispersible color (e.g. insoluble titanium dioxide) or chocolate, from separating or settling out. Cocoa and/or chocolate liquor normally gives opaqueness to chocolate-flavored confections, and artificial color or non-fat milk-derived solids (NFMS) normally give opaqueness to other confections within the scope of this invention.

Details

In weight percentages compositions according to this invention contain from 0.08 to 0.2 percent of preservative, from 0.10 to 0.8 percent of stabilizer, from 20 to 38 percent of sweetener, sufficient food acid to obtain a desired (based on taste) pH, natural and/or artificial flavor to taste and/or from 1 to 4 percent of chocolate liquor or cocoa, from 1 to 3 percent of NFMS and/or from 0.01 to 0.05 percent of artificial color. A chocolate-flavored composition is optionally prepared with chocolate flavor, an opacifier and artificial color, i.e. without chocolate or cocoa. The compositions are aqueous compositions containing sufficient water to provide a total-solid range between 20° and 40° Brix. Natural or artificial colors are incorporated in the compositions as desired, and salt is optional. The stabilizer serves to suspend solid particles, to thicken the composition to a point of gellation, to impart storage stability and shelf life to the composition and to provide the composition with a chewy or fudge-like consistency when it is frozen. The compositions have from 0.01 to 0.05 percent by weight of artificial color or from 1 to 4 percent by weight of some other ingredient to render it opaque; such ingredient is, e.g., chocolate liquor or cocoa when either of these is present, NFMS, an artificial water-dispersible color or pigment or a milk or other dairy product in other compositions. NFMS is an optional component in those compositions which contain chocolate liquor and/or cocoa.

The stabilizer is a key ingredient of these unique compositions, which need not contain any xanthan gum (required for the corresponding of U.S. Pat. No. 3,784,715). A suitable single stabilizing agent is LMP or CGN. Prior-art references to "pectin" or to "pectins" in connection with confection compositions in any way comparable with those of the instant invention are uniformly references to HEP, which is materially different and which will not gel a milk-containing product. Compositions (which are free from NFMS or other dairy product wherein the stabilizer comprises LMP) must contain at least traces of a polyvalent ion. Divalent metal ions, such as those of a calcium salt, e.g. from 0.05 to 0.2 percent by weight of calcium chloride hydrate, are suitably employed for this purpose.

Irrespective of the opaqueness-imparting ingredient, the subject compositions advantageously contain from 0.3 to 0.4 percent by weight of LMP, preferably in pectinic-acid-amide form, and, optionally, from 0.1 to 0.45 percent by weight of CMC. This particular stabilizer suspends and stabilizes solid particles present in the composition by imparting to the admixture a thickness or texture (at room temperature) which is on the verge or at the point of being semi-solid; it is referred to herein as a pudding-like texture.

A similar texture is imparted to the composition when the stabilizer is in the form of CGN alone or a combination of CGN and CMC. When this stabilizer is employed, the individual components are preferably in the range of 0.15 to 0.4 percent by weight of CGN to from 0.1 to 0.4 percent by weight of CMC. Accordingly, the preferred percent by weight of this stabilizer in the subject compositions is from 0.25 to 0.8 percent. Unlike LMP or a combination of LMP with CMC, no polyvalent-metal ions are required in compositions wherein the stabilizer is CGN alone or a combination of CGN and CMC. All of the indicated stabilizers yield frozen confections which have a chewy or fudge-like character. At lower pH's, i.e. at or about pH 3.0, adverse effects with regard to gelation are particularly well avoided by using CGN in combination with CMC.

Naturally, the herein-specified stabilizer, i.e. LMP, a combination of LMP and CMC, CGN or a combination of CGN and CMC, is suitable when employed as the sole stabilizer of the confection compositions. Each, however, can also be employed in combination with any other and/or in combination with one or more further stabilizers. A critical limitation of the stabilizer is that it yields a thickened confection composition having storage stability and in which syneresis (unsightly separation of water from the liquid mass) does not occur when the composition is maintained at room temperature. A further critical limitation of the stabilizer is that the composition (when frozen and in ready-to-eat form) has a chewy and "fudgy" texture.

The combination of LMP and CMC or the combination of CGN and CMC protects a composition (of this invention) from syneresis and from separation of insoluble ingredients even when the composition is kept hot for several hours in a vat prior to being filled [at filling temperature (160° to 180° F.)] into a suitable receptacle, container or ultimate package. When LMP (with the required polyvalent metal ions) or CGN is used as the sole stabilizer, the product (at room temperature) tends to have an appearance of not being completely homogeneous. The noted combined stabilizers (with CMC) are thus preferred also from an esthetic viewpoint.

Chocolate-flavored confection compositions optionally contain NFMS and ordinarily contain chocolate liquor and/or cocoa. The term "cocoa" is intended to be interpreted in the same manner as in U.S. Pat. No. 3,784,715 (particularly column 2, lines 25 to 44), the pertinent text of which is incorporated herein by reference. Employed cocoa is either natural-process or Dutched-process cocoa and is optionally used either alone or in combination with chocolate liquor. From 1.5 to 2 percent by weight of natural medium-fat cocoa is preferred.

Although the sweetener can be synthetic sweetener, it is most advantageous to use a sweetener, such as cane sugar, corn syrup, corn sugar and/or high-fructose corn syrup, of natural origin. To obtain a desired degree of sweetness and consistency upon freezing, the preferred sweetener comprises equal amounts of 42 D E corn syrup and cane sugar. Both the chocolate-flavored and other confections according to this invention contain from 20 to 38 percent by weight of sweetener.

The contemplated preservative is a chemical preservative, such as sodium benzoate, potassium sorbate, sodium sorbate or sorbic acid. Potassium sorbate (0.12 percent by weight) is recommended both as least objectionable in taste and as most effective at the contemplated pH.

The acid employed to achieve the desired pH is any acid approved for use in food. Approximately 0.1 percent (or more) by weight of either, e.g., citric or malic acid is suitable for this purpose. The actual amount of acid used is that which is sufficient to obtain the desired taste and to comply with federal regulations; a pH of at most 4.6 is recommended.

The amount of water present in the aqueous confection compositions is dependent upon the type and concentration of sweetener. The soluble solids must result in an aqueous composition of from 20° to 40° Brix; a confection composition of 32° Brix is preferred.

What is meant by non-fat milk-derived solids (NFMS) is well known in the art. These naturally include non-fat dry-milk solids (NFDM), such as dried skim milk, and others, such as skim milk, whey and whey derivatives.

Fruit pulp in the form of, e.g., banana, mango or coconut puree or fruit concentrate, such as apple, citrus or pinneapple juice concentrate, is optionally included in these compositions. Such is not in any way critical to the present invention, and their selection as optional ingredients depends on particular flavor requirements and consumer demands. However, when any fruid particles (irrespective of size within the normal range) are present, they should be so suspended within the body of the confection as to make the non-frozen flavored confection composition appealing to the eye. The confection compositions are flavored to taste. Suitable flavorants include seasoning, such as salt, pure vanilla or artificial flavor, such as vanillin, ethyl vanillin and imitation fruit or chocolate flavors. Such seasoning and/or flavors are optionally incorporated in compositions either singly or in any suitable combination. The compositions are prepared in a blending tank equipped with a suitable agitator. To water in the blending tank the preservative and NFMS (when used) are added under agitation before the stabilizer is introduced into the blending tank. Thereafter, the resulting admixture is conventionally heated to a temperature of about 150° F. (65.5° C.) before adding sweetener, cocoa or chocolate liquor (when used), any salt, flavoring, coloring and fruit pulp or concentrate (when used) in, e.g., that order. To prepare milk-solids-free compositions with an LMP-based stabilizer, a suitable polyvalent-metal, e.g. calcium, salt, dissolved in hot (about 60° C.) water, is added after the LMP. After all of the required ingredients are admixed, the resulting batch is brought to volume by the addition of water and is then heated to 175° F. (79.5° C.).

The final step in preparing the compositions is adjusting the pH. For this purpose a suitable acid is added until the composition has the desired taste and satisfies prevailing regulations. The acid employed must be one which is approved for use in food compositions.

After the pH is suitably adjusted, the admixture is filled (e.g. at 165° F. or 73.9° C.) according to conventional and well-established procedures into plastic packages suitable for filling and sealing at elevated temperatures. Filling at this temperature insures that spoilage organisms do not develop. Thus-packaged confections are storable at room temperature for many months and are suitable for freezing just prior to eating.

In view of the nature and consistency of the subject compositions, they can be sold in non-refrigerated sealed containers. Even after the container is opened, the compositions keep without refrigeration and without deterioration for at least several days. The compositions are useful as desserts (pudding) or dessert topping directly from the containers in which they are sold or as pie filling. When used as pie filling, the pie need not be refrigerated. A composition of this invention is readily component which imparts a chocolate or cocoa flavor to the confection. The flavor of the confection is that of a fruit, chocolate, cocoa, butterscotch, caramel or other non-fruity confection. The composition has a pudding-like texture and total soluble solids reflected by a range of from 20° to 40° Brix, corresponding to a density from approximately 1.083° to about 1.1787. When frozen, the composition has a chewy or fudge-like character. The pH of the composition can be as high as pH 5.0 or even higher, but is conveniently at most pH 4.6 in view of federal regulations. The lower end of the range is about pH 3.0

All compositions which satisfy all of these criteria are regarded to be within the scope of the invention. The preceding description is susceptible to various modifications, changes and adaptations, as is readily apparent to those skilled in the art.

| EXAMPLE Ingredients (% by weight) | 1 | 2 | 3 | 4 | 5 | 6 | 7 | 8 | 9 | 10 |
|---|---|---|---|---|---|---|---|---|---|---|
| | | Chocolate | | | Orange | Vanilla | Mango | | Butterscotch | |
| Water | 57.35 | 65.35 | 62.88 | 67.14 | 72.87 | 67.82 | 56.52 | 77.14 | 56.54 | 66.05 |
| Potassium Sorbate | 0.12 | 0.15 | 0.12 | 0.15 | 0.05 | 0.20 | 0.08 | — | 0.12 | 0.15 |
| Sodium Benzoate | 0.08 | — | — | — | 0.08 | — | 0.10 | 0.20 | — | — |
| Cream | — | — | — | — | 1.00 | 1.00 | — | — | — | — |
| NFMS | 2.00 | — | 2.00 | — | — | — | 1.60 | 1.00 | 2.00 | 3.00 |
| Coffee Whitener[i] | — | 2.00 | — | — | — | — | — | — | — | — |
| LMP[a] | 0.40 | 0.40 | — | — | 0.45 | — | 0.45 | — | 0.40 | — |
| CGN[b] | — | — | 0.42 | 0.50 | — | 0.40 | — | 0.15 | — | 0.25 |
| Hi-Viscosity CMC[c] | 0.20 | 0.15 | 0.30 | — | — | — | — | 0.25 | — | 0.35 |
| Cocoa (10 to 11% Fat) | 1.50 | 2.00 | 2.00 | 2.00 | — | — | — | — | — | — |
| Chocolate Liquor | — | 0.50 | — | — | — | — | — | — | — | — |
| Corn Syrup Solids | — | — | — | — | — | 15.00 | 20.00 | — | — | — |
| Orange Oil | — | — | — | — | 0.02 | — | — | — | — | — |
| Artificial Mango Flavor[d] | — | — | — | — | — | — | 0.06 | 0.04 | — | — |
| Artificial Butterscotch-Flavor[d] | — | — | — | — | — | — | — | — | 0.03 | 0.04 |
| Chocolate Flavor[d] | 0.02 | 0.04 | — | — | — | — | — | — | — | — |
| Vanillin | 0.02 | 0.01 | 0.02 | 0.01 | — | 0.20 | 0.05 | 0.05 | — | — |
| Ethyl Vanillin | 0.008 | — | — | — | — | — | — | — | — | — |
| Corn Syrup 42 DE[e] | 28.00 | 15.00 | 15.00 | 15.00 | 10.00 | 15.00 | — | 5.00 | 8.00 | 15.00 |
| Sucrose | 10.00 | 14.00 | 17.00 | 15.00 | 15.00 | — | 20.00 | 15.00 | 14.00 | 15.00 |
| Citric Acid | 0.10 | 0.10 | 0.10 | 0.10 | — | — | — | 0.10 | 0.10 | — |
| Malic Acid | — | — | — | — | 0.25 | 0.10 | 0.11 | — | — | 0.11 |
| Calcium Chloride, Hydrate | — | 0.20 | — | — | 0.20 | 0.20 | — | — | — | — |
| Salt | 0.20 | 0.10 | 0.16 | 0.10 | 0.08 | 0.06 | 0.01 | 0.04 | 0.08 | 0.03 |
| FD&C Yellow #6[f] | — | — | — | — | — | — | 0.02 | 0.03 | — | — |
| Orange Concentrate[g] (58° Brix) | — | — | — | — | — | — | 1.00 | 1.00 | — | — |
| Caramel Color[h] | — | — | — | — | — | — | — | — | 0.01 | 0.02 |
| Titanium Dioxide | — | — | — | — | — | 0.02 | — | — | — | — |

[a]Pectin LM #3477 Sunkist 100 grade
[b]Staymere CK (Meer Corp.)
[c]Hercules 7H3SCF
[d]Artificial, water dispersable
[e]Dextrose Equivalent
[f]4.7 percent solution
[g]Frozen
[h]Acid proof
[i]Cremora (Borden)

placed in a prebaked pie shell, levelled off and served as is or with a suitable topping. If desired, such dessert can be refrigerated prior to serving.

Exemplary embodiments of the present invention follow. These embodiments are presented in the form of ingredients which are combined into compositions according to the previously-described precedure and similarly filled into and sealed in plastic packages in the art-established manner. The examples are presented solely for the purpose of illustration and do not limit the nature or scope of the invention in any way.

There are a number of critical features in the present invention. The compositions are opaque; the opacity thereof is brought about by any of many dairy products, e.g. milk, cream and caseinates, by non-dairy creamers, e.g. Cremora Powder, by artificial color and/or by the

What is claimed is:
1. An edible, room-temperature storable, syneresis-free, stable, aqueous, opaque, flavored confection composition comprising as essential ingredients, which are free from xanthan gum:
(a) an effective amount of stabilizer suitable to suspend and stabilize solid particles in the composition and to produce a chewy product when the composition is frozen,
(b) from 0.08 to 0.2 percent by weight of preservative,
(c) sufficient flavoring to impart flavor to the composition,
(d) from 20 to 38 percent by weight of sweetener,

(e) sufficient water to impart to the composition a density in the approximate range of from 20° to 40° Brix and (f) sufficient acid to adjust the pH of the composition within the range of from about 3.0 to about 5.0.

2. A substantially homogeneous gel-form composition according to claim 1.

3. A chocolate-flavored confection composition according to claim 1.

4. A composition according to claim 1 wherein the acid is food acid and the composition contains from 1 to 3 percent by weight of milk solids.

5. A chocolate-flavored confection composition according to claim 4.

6. A composition according to claim 3 which is free from milk solids and wherein stabilizer (a) comprises from about 0.3 to about 0.4 percent by weight of low-methoxyl pectin and at least traces of a polyvalent metal ion.

7. A composition according to claim 6 wherein stabilizer (a) comprises from about 0.1 to about 0.45 percent by weight of carboxymethylcellulose.

8. A composition according to claim 3 which is free from milk solids and wherein stabilizer (a) comprises from about 0.15 to about 0.50 percent by weight of carrageenan.

9. A composition according to claim 8 wherein stabilizer (a) comprises from about 0.25 to about 0.35 percent by weight of carboxymethylcellulose.

10. A chocolate-free composition according to claim 4 wherein stabilizer (a) comprises from about 0.3 to about 0.4 percent by weight of low-methoxyl pectin.

11. A composition according to claim 10 wherein stabilizer (a) comprises from about 0.1 to about 0.45 percent by weight of carboxymethylcellulose.

12. A chocolate-free composition according to claim 4 wherein stabilizer (a) comprises from about 0.15 to about 0.25 percent by weight of carrageenan.

13. A composition according to claim 12 wherein stabilizer (a) comprises from about 0.25 to about 0.35 percent by weight of carboxymethylcellulose.

14. A composition according to claim 5 wherein stabililzer (a) comprises from about 0.3 to about 0.4 percent by weight of low-methoxy pectin.

15. A composition according to claim 14 wherein stabilizer (a) comprises from about 0.1 to about 0.45 percent by weight of carboxymethylcellulose.

16. A composition according to claim 5 wherein stabilizer (a) comprises from about 0.15 to about 0.50 percent by weight of carrageenan.

17. A composition according to claim 16 wherein stabilizer (a) comprises from about 0.25 to about 0.35 percent by weight of carboxymethylcellulose.

18. Storage-stable freezable composition according to claim 1 completely surrounded by and sealed in a container.

19. Storage-stable freezable composition according to claim 1 completely surrounded by and sealed in a plastic film pak.

20. A chocolate-free composition according to claim 1 having a non-milk-derived opacifying agent.

21. An edible, room-temperature storable, stable, aqueous, opaque, flavored confection composition comprising:

(a) an effective amount of stabilizer suitable to suspend and stabilize solid particles in the composition, to thicken the composition and to produce a chewy product when the composition is frozen, (b) from 0.08 to 0.2 percent by weight of preservative, (c) sufficient flavoring to impart flavor to the composition, (d) from 20 to 40 percent by weight of sweetener, (e) sufficient water to impart to the composition a density in the approximate range of from 20° to 40° Brix and (f) sufficient acid to adjust the pH of the composition within the range of from about 3.0 to about 4.0.

22. A composition according to claim 1 having a pH of at most 4.6.

23. A composition according to claim 21 having a pudding-like consistency at room temperature.

24. A composition according to claim 21 wherein stabilizer (a) comprises low-methoxyl pectin.

25. A composition according to claim 21 wherein stabilizer (a) comprises carrageenan.

26. A composition according to claim 21 wherein stabilizer (a) comprises a combination of low-methoxyl pectin and carboxymethylcellulose.

27. A composition according to claim 21 wherein stabilizer (a) comprises a combination of carrageenan and carboxymethylcellulose.

28. A syneresis-free composition according to claim 21.

29. A composition according to claim 21 which is free from milk solids.

30. A chocolate-flavored composition according to claim 29.

31. A composition according to claim 21 which has from 1 to 3 percent by weight of milk solids.

32. A chocolate-free composition according to claim 31.

33. A chocolate-flavored composition according to claim 31.

* * * * *